Aug. 28, 1923.

J. WHEELER 1,465,958

WHEEL HUB CONSTRUCTION

Filed Aug. 11, 1920

Inventor:
John Wheeler,
By Cheever & Cox
Attys.

Patented Aug. 28, 1923.

1,465,958

UNITED STATES PATENT OFFICE.

JOHN WHEELER, OF CHICAGO, ILLINOIS.

WHEEL-HUB CONSTRUCTION.

Application filed August 11, 1920. Serial No. 402,776.

*To all whom it may concern:*

Be it known that I, JOHN WHEELER, a citizen of the United States, residing at Chicago, in the county of Cook and State of Illinois, have invented a certain new and useful Improvement in Wheel-Hub Constructions, of which the following is a specification.

This invention relates to wheels, more particularly the type of wheel used in various arts, notably in the automobile art where it is desirable to demount the wheel from the hub of the vehicle for any purpose.

The object of the invention is to provide a construction in which the wheel, when in place on the vehicle hub, is perfectly rigid and in effect united therewith so the proper operating action takes place without movement of the wheel with reference to the vehicle hub and to do this in such a way that the operator, even a lady or a child, can readily manipulate the parts to easily remove the wheel from the hub. A special object is to provide a readily accessible and operatable nut for firmly securing the wheel in assembled position on the hub. A further object is to so construct this nut that there is no direct pressure on the threads of the nut when the wheel is in operation and to thus eliminate the gradual deterioration or destruction of the threads on either the hub or the nut, which takes place in many prior constructions.

The invention consists in means for carrying out the foregoing objects which can be easily and comparatively cheaply made, which is generally satisfactory in operation, particularly in that it is substantially dust-proof, and which is not readily liable to get out of order. More particularly the invention consists in features and details of construction more fully set forth in the specification and claims.

Referring to the drawings in which like numerals denote like parts thruout the several views, Figure 1 is a central sectional detail view thru mechanism illustrating this invention in its preferred form applied to one of the standard wheel axles now on the market and commonly used upon automobiles.

Figure 1:
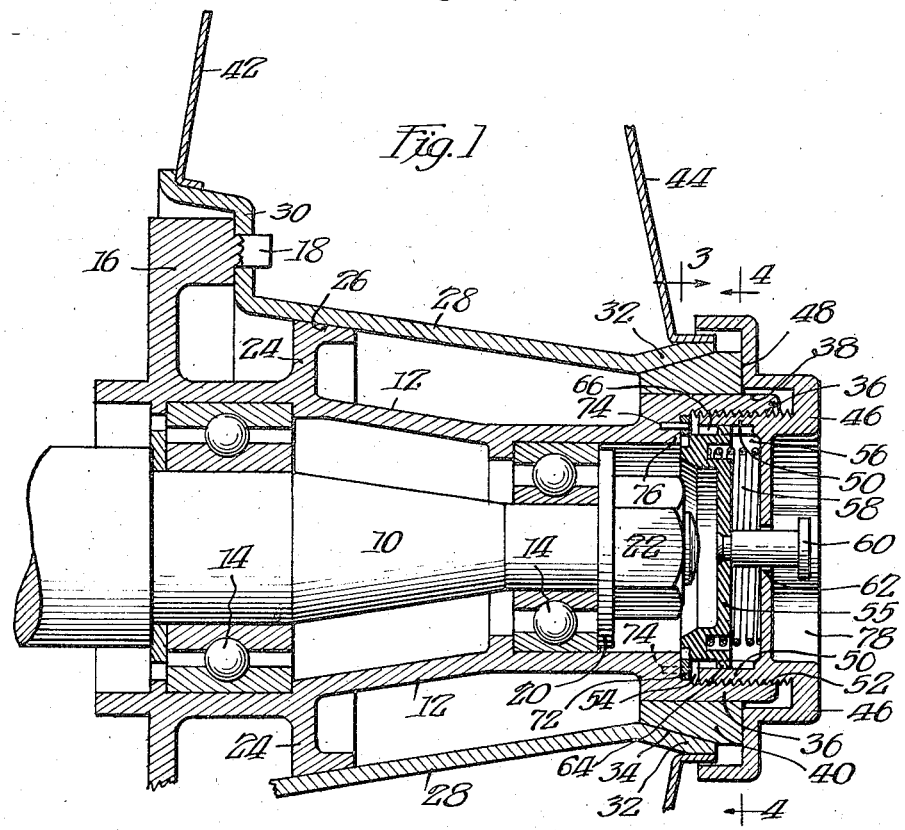
Figure 3:
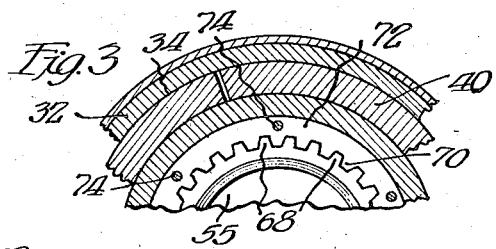
Figure 3 is a detail sectional view of certain parts taken on the line 3—3 of Figure 1.
Figure 2:
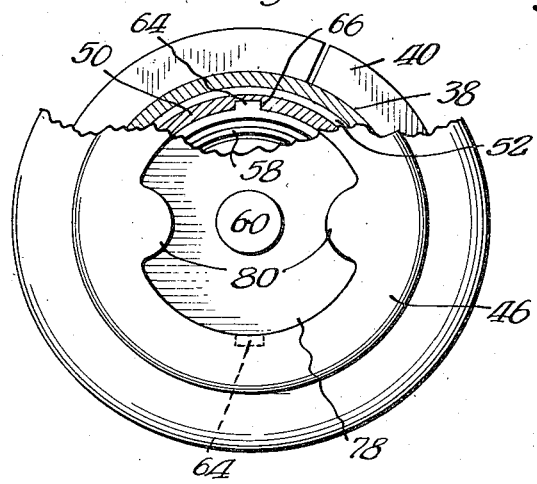
Figure 2 is an end view taken from the right hand end of Figure 1.
Figure 4:
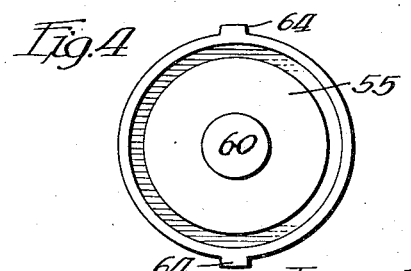
Figure 4 is an end view of the nut locking plate removed from other parts, the same as seen from approximately the line 4—4, Figure 1.

A commercial type of wheel construction shown in the drawings, which happens to be for a front wheel hub and therefore provided with ball bearings includes the car axle 10 surrounded by a hub 12, hereafter referred to as the "inner hub", rotatable with reference to the axle on ball bearings 14 in the ordinary manner. The inner end of this hub 12 carries a flange 16 whose front face is, as well known in the art, provided with a plurality of projections 18 with which the mechanism of this invention, to be hereinafter described, interfits. This inner hub 12 is so secured to the axle 10 by the washer 20 and the nut 22 that endwise movement of the inner hub with reference to the axle is prevented thereby insuring proper operation of ball bearing mechanism 14.

At some suitable point on the inner hub 12 adjacent to, but in front of flange 16, is an annular flange 24 having its outer circumference formed with the inclined surface 26 against which the hub 28 of this invention bears in the manner shown in the drawings. This surface 26 is so inclined toward the outer end of the axis of the wheel that as the hub 28 is moved to the left, as viewed in the drawings, to permanent locked position on the inner hub 12, the outer hub 28 wedges onto the surface of this surface 26 just as or before the portion 30 of the outer hub seats itself upon the projecting members 18, and abuts upon member 16. In other words, the outer hub 28 wedges onto the member 24 before the hub seats itself on the members 18, thus preventing subsequent endwise movement of the outer hub 28 and consequent rattle common in the old art between the members 30 and 16.

The extreme front or outer end of the hub 28 of this invention is tapered outwardly in the tubular portion 32 so as to form on its inside an inclined surface 34 tapered in the opposite direction from the surface 26. This portion 32 of the hub 28 surrounds a cylindrical end portion 36 of the inner hub 12. The cylindrical outer surface 38 of this portion 36 is concentric with the central axis of the wheel. Between these two surfaces 34 and 38 is interposed a wedge shaped annular split ring 40 adapted when moved to the left, as viewed in Figure 1, to wedge in between these surfaces and not only hold the outer hub 28 central with reference to the wheel axis and the inner hub 12, but it also tends to drive the hub 28 to the left, as viewed in Figure 1, onto the inclined surface 26 of the member 24, thus insuring both the position and the locking and the centering of the outer hub 28 on the inner hub, and on the axle.

The wheel proper is formed upon or carried by the outer hub 28. In the particular case here illustrated the wheel is indicated by inner and outer disks 42 and 44 of a metallic disk wheel of conventional construction.

If the parts thus far described would stay in place under the jar of road conditions the other devices hereafter described might be omitted, but in practice it is not safe to rely on their doing so and the invention therefore includes means for selectively locking the ring 40 against movement to the right or off from the axle.

This means includes a cap 46 so shaped and formed that when in assembled position it abuts the exterior surface 48 of the ring 40 to not only hold the ring in working position described, but to form a dust cap or shield for the ends of the hub mechanism and the parts to be hereafter described. This cap 46 is detachably secured in this position by providing on its inner face a projecting hub 50 of sufficiently small external diameter so that screw threads 52 on its outer circumference will engage corresponding screw threads on the inner circumference of a recess 54 formed in the end of member 36 for the purpose. The result of this construction is that when the nut 46 is in place, there is no external object working frictionally upon these threads 52 or threads interfitting with them, to destroy either set of threads. The life of these securing threads, is therefore, limited only by the life of the entire structure.

The nut 46 or cap is detachably, selectively locked in place so that it cannot turn off from the screw threads thru the agency of a non-rotatable locking plate 55 reciprocatable backward and forward inside of a recess or chamber 56 toward and from the end of the hub 10. This plate 55 is moved to the left, as viewed in Figure 1, by a spring 58 and is manually movable to the right by the operator's manipulating by any suitable means the handle 60 extending thru a suitable perforation 62 provided for it in the cap 46. The locking plate 55 is prevented from rotation with reference to the nut or cap 46 by one or more teeth 64, each sliding in a suitable slot or track 66 provided for it in the interior surface of the cap or nut.

About the circumference of the inner end of the plate 55 are a plurality of projecting members, in the particular case here illustrated, gear teeth 68 adapted to selectively interfit with other projecting members or gear teeth 70 formed on a ring 72 held non-rotatably in the end of the hub 12 by pins 74. When the spring 58 has moved plate 55 as far as it will go to the left, as viewed in Figure 1, these teeth 68 and 70 intermesh with the result that it is impossible to rotate the cap 46, but when the operator has moved plate 55 to the right against the action of spring 58 so that the teeth 68 clear the teeth 70, the cap may be rotated and removed along the screw threads 52.

The plate 55 and the projecting teeth 68 thereon are so proportioned with reference to the ring 72 and the inner end portion 76 of the inner hub 12, that the spring 58 cannot move the gear teeth thru and beyond engagement position with teeth 70 on ring 72.

Any sort of means may be provided for manually rotating cap 46. In the particular case here illustrated the inner circumference of an exterior recess 78 in the cap 46 is provided with inwardly projecting members 80 against which an internal engaging wrench (not shown) fits. The wrench is made with a hole in it so that it does not interfere with access to and movement of member 60, as heretofore described. By the use of such a wrench the operator rotates the cap 46 thru the agency of screw threads 52 in either direction as desired. When this cap is moved to the left, as viewed in Figure 1, it forcibly engages the split ring 40, compresses it, and drives it to place under the inclined surface 34 of member 32, thus moving the outer hub 28 to final locked position, as described. This, therefore, clamps the split ring in place between the various surfaces enclosing it in its compressed position, thus actually locking it in place with a tighter seating than could be obtained were a non-split ring used.

Having thus described my invention what I claim as new and desire to secure by Letters Patent, is:—

In mechanism of the class described, concentric inner and outer hubs, a cap having an internal annular axial extension provided with exterior threads engaging interior threads on the inner hub, a wedge between the outer ends of the hubs, an angular formation on the free end of the skirt of the cap one portion of which bears against the wedge while the other portion overlies the outer face of the adjacent end of the outer hub, an axially slidable plunger operating within said annular extension of the cap and having radial studs slidably engaged respectively in longitudinal grooves formed in the inner face of said annular extension, means exteriorly of the cap permitting manual sliding of the plunger with respect to the cap, a ring between the plunger and inner hub having a detachable interlocking connection with the latter, interengaging formations on the ring and plunger respectively, and spring means normally holding said plunger in position to interengage the formations thereon with those of the ring.

In witness whereof, I have hereunto subscribed my name.

JOHN WHEELER.

Witnesses:
DWIGHT B. CHEEVER,
ANNA ROSENTHAL.